United States Patent
Ramu

(10) Patent No.: US 8,674,648 B2
(45) Date of Patent: Mar. 18, 2014

(54) SINGLE SWITCH CONTROLLED SWITCHED RELUCTANCE MACHINE

(75) Inventor: Krishnan Ramu, Blacksburg, VA (US)

(73) Assignee: Regal Beloit America, Inc., Beloit, WI (US)

( * ) Notice: Subject to any disclaimer, the term of this patent is extended or adjusted under 35 U.S.C. 154(b) by 519 days.

(21) Appl. No.: 12/672,694

(22) PCT Filed: Aug. 12, 2008

(86) PCT No.: PCT/US2008/009631
§ 371 (c)(1),
(2), (4) Date: Feb. 9, 2010

(87) PCT Pub. No.: WO2009/023190
PCT Pub. Date: Feb. 19, 2009

(65) Prior Publication Data
US 2011/0025253 A1  Feb. 3, 2011

Related U.S. Application Data

(63) Continuation of application No. 11/950,952, filed on Dec. 5, 2007, now Pat. No. 7,852,038.

(60) Provisional application No. 60/955,656, filed on Aug. 14, 2007.

(51) Int. Cl.
*H02P 25/08* (2006.01)

(52) U.S. Cl.
USPC ........................................ 318/701; 318/254.1

(58) Field of Classification Search
USPC .................. 318/254.1, 400.41, 701
See application file for complete search history.

(56) References Cited

U.S. PATENT DOCUMENTS 3,402,334 A * 9/1968 Newton, Jr. .................. 318/696
4,348,619 A * 9/1982 Ray et al. ..................... 318/139
4,424,471 A * 1/1984 Collen ...................... 318/400.41

(Continued)

FOREIGN PATENT DOCUMENTS

JP  2000-516080 A  11/2000
JP  2005-528078 A  9/2005

OTHER PUBLICATIONS

International Search Report dated Oct. 8. 2008.

(Continued)

*Primary Examiner* — Bentsu Ro
(74) *Attorney, Agent, or Firm* — NSIP Law

(57) ABSTRACT

An improved single-switch control circuit for use in a multi-phase switched reluctance machine is provided. The control circuit includes at least first and second phase windings, a switch, a capacitor, and a diode. The capacitor may have a polarity opposite that of a power source in the control circuit. The first winding may be connected in series with the switch and connected in parallel with a circuit block comprising the second winding. The second winding may be connected in parallel with the capacitor and in series with the diode. In operation, the switch may be used to redirect current from the first winding to the second winding. The capacitor can become charged by the redirected current until it eventually stores enough energy to essentially discontinue current flow in the first winding. Then, the capacitor can discharge its stored energy as a current through the second winding. In this manner, substantially all of the energy from the first winding can be transferred to the second winding.

21 Claims, 5 Drawing Sheets

(56) References Cited

U.S. PATENT DOCUMENTS

| | | | |
|---|---|---|---|
| 4,682,093 A * | 7/1987 | Murphy et al. | 318/701 |
| 5,479,080 A * | 12/1995 | Jones et al. | 318/701 |
| 5,548,196 A * | 8/1996 | Lim | 318/701 |
| 6,060,858 A * | 5/2000 | Blackburn et al. | 318/701 |
| 6,781,332 B2 | 8/2004 | Kusase | |
| 7,015,615 B2 | 3/2006 | Ramu | |
| 7,271,564 B2 | 9/2007 | Ramu | |
| 7,852,038 B2 * | 12/2010 | Ramu | 318/701 |
| 2005/0146304 A1 | 7/2005 | Ramu | |

OTHER PUBLICATIONS

Japanese Notice of Reason issued May 28, 2013 in counterpart Japanese Patent Application No. 2010-521008 (2 pages, in Japanese).

* cited by examiner

SINGLE SWITCH CONTROLLED SWITCHED RELUCTANCE MACHINE

CROSS-REFERENCE TO RELATED APPLICATIONS

This application is a U.S. national stage application under 35 USC 371 of International Application No. PCT/US2008/009631 filed on Aug. 12, 2008, which claims the benefit of U.S. Provisional Application No. 60/955,656 filed on Aug. 14, 2007. International Application No. PCT/US2008/009631 is also a continuation of U.S. application Ser. No. 11/950,952 filed on Dec. 5, 2007, now U.S. Pat. No. 7,852,038 issued on Dec. 14, 2010, which claims the benefit of U.S. Provisional Application No. 60/955,656. U.S. Provisional Application No. 60/955,656 is hereby incorporated by reference in its entirety.

FIELD OF THE INVENTION

The disclosure herein relates to the field of switched reluctance machines and, more particularly, to a novel single-switch control circuit that controls phase excitations of a multi-phase switched reluctance machine.

BACKGROUND

Induction motors and universal motors are currently being used in most applications requiring constant-speed and low horsepower, mainly because of their competitive cost. To replace such conventional motors, research has been conducted on single-phase switched reluctance machines ("SRM") over the last decade. However, prior single-phase SRM machines are not generally suitable for high performance applications since they are known to have some inherent limitations, including low output power density and only a 50% duty cycle of torque generation. They also require an additional component in the form of permanent magnets or auxiliary windings for self-starting.

Because of the known deficiencies of single-phase SRMs, there has been more attention paid to multi-phase SRM machines (i.e., having more than one phase), especially for high torque and/or high-efficiency applications. For example, two-phase SRMs may be employed as brushless motor drives in variable-speed applications, such as those found in home appliances and power tools. Two-phase SRMs are particularly desirable because of their relative simplicity in design and lower costs to manufacture. Various types of two-phase SRMs are known in the art, for example, as described in U.S. Pat. No. 7,015,615, by K. Ramu et al., issued Mar. 21, 2006.

FIGS. 1A and 1B illustrate one example of a conventional two-phase SRM 100. The exemplary two-phase SRM includes a stator 110 having four stator poles 115 and a rotor 120 having two rotor poles 125. The rotor 120 is adapted to rotate around a fixed shaft 130 connected to the center of the rotor. A first pair of concentric windings 140, such as copper coils, are positioned around respective diametrically opposite stator poles 115A. The windings 140 may be electrically connected in series or in parallel. Similarly, a second pair of concentric windings 150 is positioned around respective diametrically opposite stator poles 115B. The windings 150 likewise may be connected in series or in parallel. FIG. 1A shows the exemplary two-phase SRM 100 in a first phase. In this first phase, a current is applied through the windings 140 and the resulting magnetic forces cause the rotor poles 125 to align with the stator poles 115A. FIG. 1B shows a second phase in which a current through the windings 150 causes the rotor poles 125 to align with the stator poles 115B. By selectively energizing the windings 140 and 150, the first and second phases of the SRM are activated and the rotational speed of the rotor 120 can be controlled.

The phase windings in a multi-phase SRM are typically energized by a control circuit associated with the SRM. As used herein, a "phase winding" refers to one or more windings used to activate a single phase of a SRM or other brushless machine. For example, in FIGS. 1A and 1B each set of windings 140 and 150 may constitute a different phase winding in the SRM 100. Most typically, the SRM control circuit comprises at least one switch per phase winding, for turning on and off current flow in that winding. For example, again with reference to FIGS. 1A and 1B, at least one switch (not shown) may be used to control the current flow through phase winding 140, whereas at least one different switch (not shown) may control the current flow through phase winding 150. U.S. Pat. No. 7,271,564, by K. Ramu, issued Sep. 18, 2007, at FIGS. 1-4 illustrates various examples of conventional multi-switch control circuits for use with multi-phase SRM machines.

One drawback to conventional multi-switch SRM control circuits is their cost. That is, each switch in the control circuit is typically associated with additional circuitry for controlling its operation. For example, each switch may be implemented as a transistor switch having associated circuitry for changing the state of the switch, and may be further associated with other circuit components, such as diodes, resistors, capacitors, etc. In addition, because each switch in the multi-switch circuit may be independently controlled, yet additional circuitry may be required to implement separate switch control strategies. The added circuitry associated with each of the multiple switches tends to significantly increase both the cost and complexity of the SRM control circuit.

To overcome the disadvantages of multi-switch control circuits, single-switch control circuits have been proposed for use with multi-phase SRM machines. Previously known single-switch circuits typically require less circuitry, such as fewer transistor switches and diodes, than conventional multi-switch control circuits. As a result, the single-switch control circuits can reduce both the cost and complexity of the SRM. Such single-switch circuits also have the advantage that they do not require multiple control strategies for controlling multiple switches. Rather, only one switch may be actively controlled to trigger multiple phases of the SRM. Various single-switch SRM control circuits are disclosed, for example, in U.S. Pat. No. 7,271,564, by K. Ramu, issued Sep. 18, 2007.

FIG. 2 illustrates an exemplary single-switch control circuit 200 that can be used in a two-phase SRM. A similar single-switch control circuit is disclosed in U.S. Pat. No. 7,271,564, by K. Ramu, issued Sep. 18, 2007, for example, at FIG. 10. The exemplary control circuit 200 includes a direct current ("DC") power source 210 and control circuitry 220. As shown, the DC power source 210 may comprise an alternating current ("AC") voltage supply 215, a full-bridge rectifier (diodes D1, D2, D3, and D4), and a source capacitor C1. The source capacitor C1 may be polarized, so as to maintain a substantially DC (i.e., constant) voltage level between its positive terminal ("positive rail") and negative terminal (also referred to as a "negative rail," "common," or "ground"). Those skilled in the art will appreciate that other types of power sources that supply a substantially constant voltage level and current source for use as a DC power source alternatively could be substituted, e.g., using half-bridge rectifiers or DC voltage supplies, such as batteries.

The control circuitry 220 includes, among other things, a "main" phase winding L1 and an "auxiliary" phase winding L2, both having positive terminals electrically connected to the positive rail of the DC power source 210. The negative terminal of the main phase winding L1 is electrically connected to the collector terminal of a transistor switch Q1 and to an anode terminal of a diode D5. The negative terminal of the auxiliary phase winding L2 is electrically connected to a positive terminal of an auxiliary capacitor C2 and to a cathode terminal of the diode D5. In this context, current enters a phase winding through its positive terminal and exits the phase winding through its negative terminal. The auxiliary capacitor C2 may be a polarized capacitor having the same polarity as the source capacitor C1. For instance, the negative terminal of the auxiliary capacitor C2 may be electrically connected to the negative terminal of the source capacitor C1.

The main and auxiliary phase windings may be positioned on respective pairs of stator poles 115A and 115B (such as the windings 140 and 150 shown in FIGS. 1A and 1B). Although the phase windings L1 and L2 may be spatially separated from the control circuitry 220, and in some cases may be considered to form part of the SRM motor rather than part of its control circuitry, these windings are illustrated in the control circuitry 220 for purposes of discussion.

When current flows through the main phase winding L1, a first phase of the two-phase SRM can be activated. The second phase may be activated when current flows through the auxiliary phase winding L2. When current flows through either of the phase windings L1 or L2, i.e., and thus "energizes" the winding, the resultant magnetic energy effects a positive or negative torque in the SRM, depending on the position of the rotor 120 with respect to the energized winding. For instance, if the rotor poles 125 are rotating toward the energized winding's stator poles, the change in inductance at the stator poles is positive, thus producing a positive "motoring" torque that is output by the SRM. On the other hand, if the rotor poles 125 are moving away from the energized winding's stator poles, the inductance slope is negative and a negative "regenerative" torque will be produced, i.e., sending energy back to the DC source capacitor C1.

In operation, the transistor switch Q1 directs current through either the main phase winding L1 or the auxiliary phase winding L2 and, as such, selects a desired phase activation for the SRM. As shown in this exemplary embodiment, the transistor switch is implemented with an NPN bipolar junction transistor whose emitter terminal is electrically connected to the common (ground) potential and whose collector terminal is connected to the main phase winding L1 and diode D5. The transistor switch is turned ON and OFF by a control signal applied to its base terminal. Additional control circuitry, such as a microprocessor, digital signal processor, application specific integrated circuit, field programmable gate array, etc., for supplying the control signal is not shown but will be familiar to those skilled in the art.

When the transistor switch Q1 is turned ON, the DC voltage from the source capacitor C1 is applied across main phase winding L1 and transistor switch Q1, causing current to flow through the main phase winding and transistor switch. The voltage drop across the conducting transistor switch Q1 is typically negligible compared with the DC source voltage level. While the transistor switch Q1 is turned ON, any current in the auxiliary phase winding L2 will rapidly decay because the auxiliary capacitor C2 discharges to the DC voltage source capacitor C1, thus causing the voltage at the auxiliary capacitor C2 to eventually equal the voltage at source capacitor C1, i.e., resulting in zero voltage across the auxiliary phase winding L2. The auxiliary capacitor C2 may have a relatively small capacitance compared with DC source capacitance C1 to ensure that it can quickly discharge to the DC voltage source 210 and attain the DC source voltage level.

In such a conventional single-switch control example, when the current through the main phase winding L1 exceeds a predetermined level, or some other criteria is satisfied, the control signal applied to the transistor switch may be adjusted to turn OFF the transistor switch Q1. In this case, the current through the main phase winding L1 is redirected through the diode D5, which becomes forward biased when the transistor switch Q1 stops conducting. The redirected current quickly charges the auxiliary capacitor C2 above its residual voltage, i.e., which is equal to the DC source voltage, until the auxiliary-capacitor voltage exceeds the DC source voltage and causes current to flow through the auxiliary phase winding L2.

In some applications, conventional single-switch control circuits may underutilize the torque-producing capability of the SRM. For example, there may exist situations where the auxiliary capacitor C2 generates a current in the auxiliary phase winding L2 before current has finished flowing in the main phase winding L1. In such a situation, simultaneous current flow through the main and auxiliary phase windings may reduce the net torque produced by the SRM, because the auxiliary phase winding L2 may produce a positive torque at the same time that the main phase winding L1 generates a negative torque (or vice versa). A further reduction in net torque may result if the current redirected into the auxiliary phase winding L2 circulates back into the main phase winding L1 or into the source capacitor C1. In these cases, the auxiliary phase winding L2 is deprived from using all of the energy transferred to it from the main phase winding L1, thus reducing the amount of torque that the auxiliary phase winding L2 can produce in the SRM. Such recirculation losses also may increase the commutation time required to transition from the first phase to the second phase.

SUMMARY OF THE INVENTION

The disclosed embodiments provide an improved single-switch control circuit for use in a multi-phase switched reluctance machine. To that end, the novel control circuit includes at least a power source, first and second phase windings, a switch, a capacitor, and a diode. In accordance with the disclosed embodiments, operation of the switch determines which one of the first or second windings is energized. The control circuit may be arranged so that the first winding is electrically connected in series with the switch and electrically connected in parallel with a circuit block comprising the second winding. Specifically, the second winding may be electrically connected both in parallel with the capacitor and in series with the diode. In the disclosed embodiments, the capacitor may be a polarized capacitor having a polarity opposite that of the power source. By orienting the capacitor's polarity in this manner, when the switch is used to direct current through the first winding (e.g., a first phase of the SRM), substantially no current is conducted through either the capacitor or the second winding. Thus, unlike single-switch control circuits known in the art, the capacitor accumulates essentially no charge while the current in the first winding is controlled by turning the switch ON and OFF.

Further to the disclosed embodiments, the switch may be used to redirect current from the first winding to the second winding (e.g., a second phase of the SRM). Because the capacitor stores essentially no residual charge from the first phase activation, the capacitor can become charged by the redirected current until it eventually stores enough energy to substantially stop the current flow in the first winding. Then, the capacitor can discharge its stored energy through the second winding, where the discharged current from the first winding is subsequently consumed for torque generation. The diode may ensure that the current discharged from the capacitor flows directly into the second winding, and not back into the first winding. In this improved and controlled manner, substantially all of the energy from the first winding can be transferred to the second winding via the capacitor, thereby maximizing the amount of torque that the second winding can produce in the SRM. Additionally, the improved efficiency of this novel single-switch control circuit can eliminate recirculation losses in the SRM by preventing current in the second winding from circulating back into the first winding or into the power source.

Advantageously, the disclosed embodiments may find applications in various multi-phase SRM machines as well as permanent magnet brushless machines having two or more phases. Additional advantages of aspects of the invention will be set forth in part in the description which follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention as claimed.

BRIEF DESCRIPTION OF THE DRAWINGS

The drawings, which are incorporated in and constitute a part of this specification, illustrate embodiments of the invention and together with the description, serve to explain the principles of the invention. Wherever possible, the same reference numbers will be used throughout the drawings to refer to the same or like parts.

DESCRIPTION OF THE DISCLOSED EMBODIMENTS

The disclosed embodiments provide an improved single-switch control circuit for use in a multi-phase switched reluctance machine. In the disclosed exemplary embodiments, the single-switch SRM control circuit may include a main phase winding that is electrically connected in series with a switch and connected in parallel with a circuit block comprising an auxiliary phase winding. The main phase and auxiliary phase windings each may comprise one or more concentric coils positioned on stator poles in the SRM. Furthermore, the main phase and auxiliary phase windings may be positioned so that any time a current is applied to either the main phase winding or auxiliary phase winding, a torque (positive or negative) is generated in the SRM. The auxiliary phase winding may be electrically connected in parallel with an auxiliary capacitor and connected in series with a diode. The auxiliary capacitor may be a polarized capacitor having a polarity opposite that of a DC power source in the control circuit. The series-connected diode prevents any current flow from the main phase winding to the auxiliary phase winding or auxiliary capacitor when the switch is used to direct current through the main phase winding (e.g., a first phase of the SRM). Further, the configuration of the auxiliary capacitor and diode also prevents current conduction in the auxiliary phase winding during the first phase activation.

The switch may be used to redirect current from the main phase winding to the auxiliary phase winding (e.g., a second phase of the SRM). Because the auxiliary capacitor stores essentially no charge during the first phase, the auxiliary capacitor becomes charged by the redirected current until the capacitor eventually stores enough energy to substantially stop the current flow in the main phase winding. Then, the auxiliary capacitor can discharge its stored energy as a current through the auxiliary phase winding, where the discharged current is subsequently consumed to produce a torque in the SRM. The orientation of the diode may ensure that the current discharged from the auxiliary capacitor flows directly into the auxiliary phase winding, and not back into the main phase winding.

In this controlled manner, substantially all of the energy from the main phase winding can be transferred to the auxiliary phase winding via the auxiliary capacitor, thereby maximizing the amount of torque that the auxiliary phase winding can produce during the second phase. Additionally, the improved efficiency of the disclosed single-switch control circuits can eliminate recirculation losses in the SRM by preventing current in the auxiliary phase winding from circulating back into the main phase winding, or flowing into the DC power source, during the second phase activation.

Figure 1A:
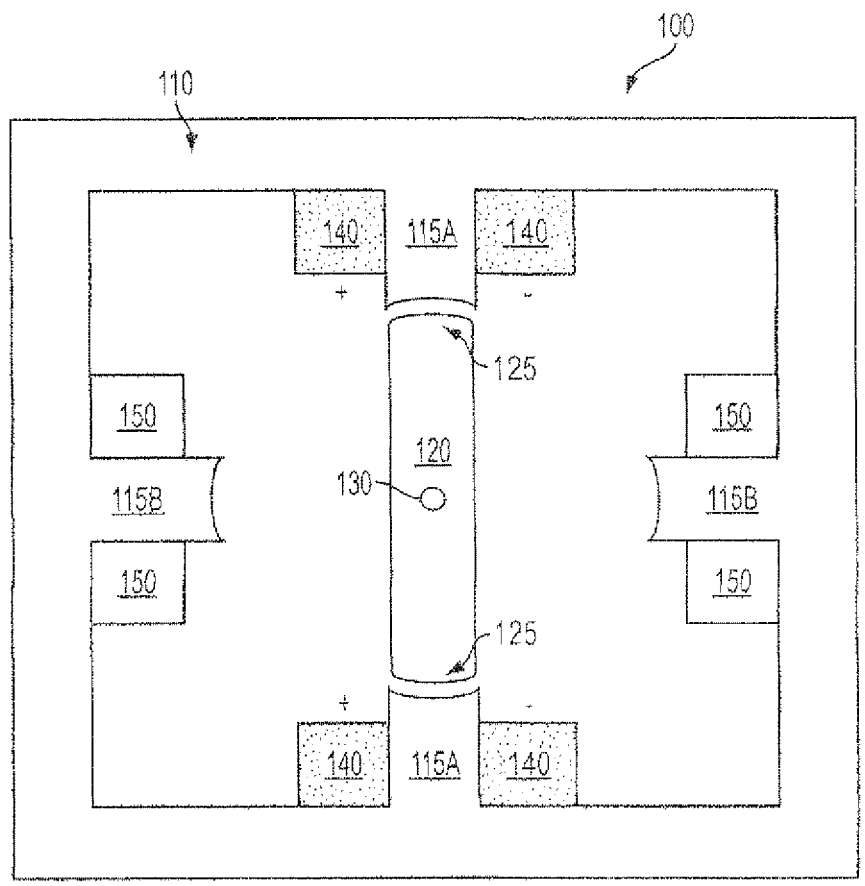
FIG. 1A, previously described, is a schematic diagram of a conventional two-phase SRM in a first phase energization.
Figure 1B:
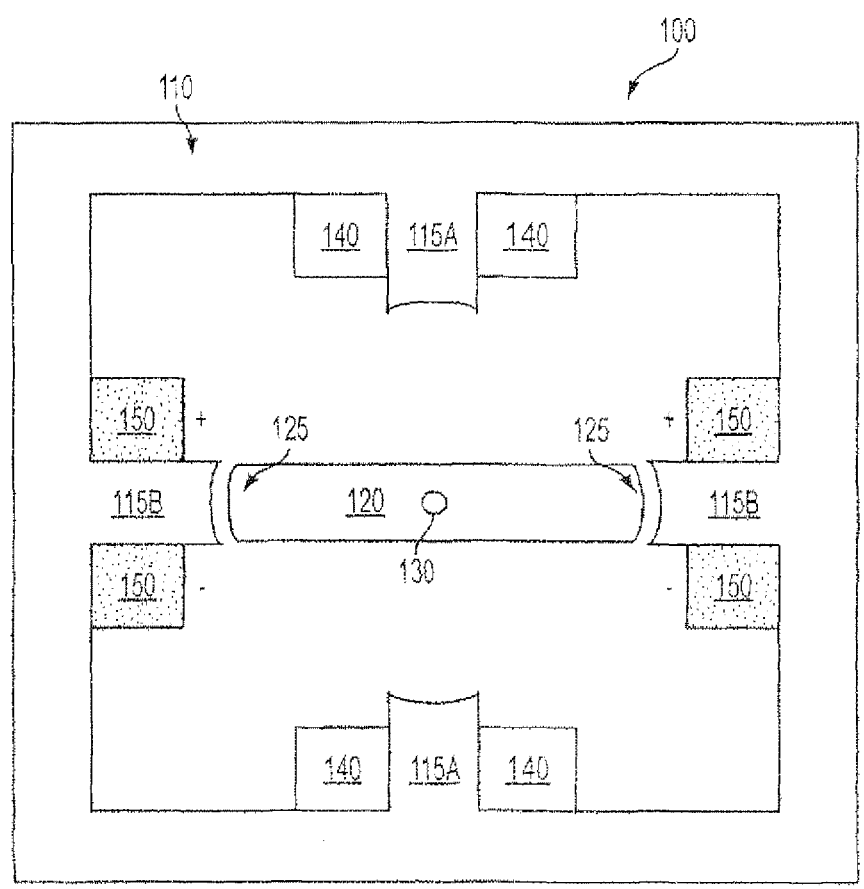
FIG. 1B, previously described, is a schematic diagram of a conventional two-phase SRM in a second phase energization.
Figure 2:
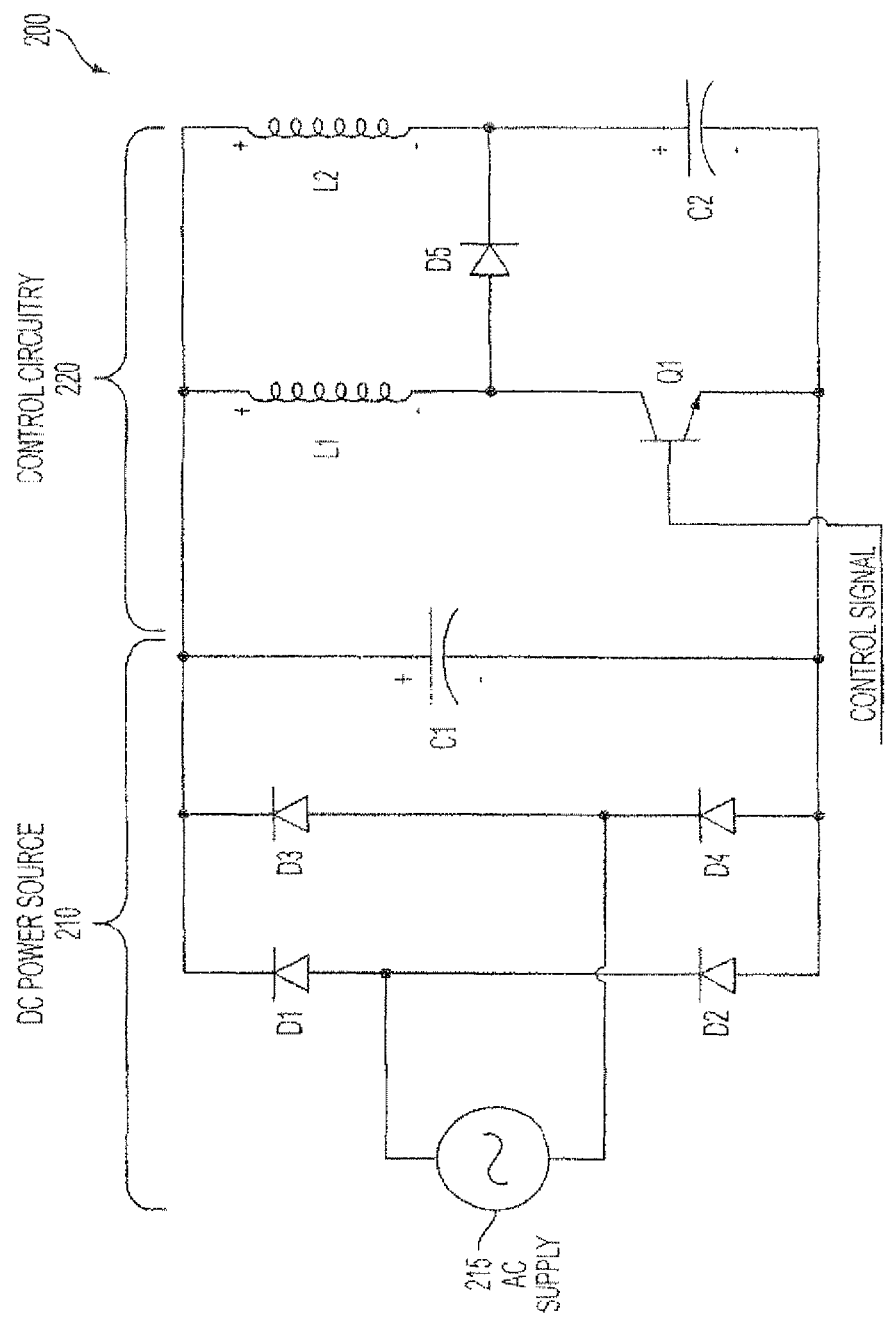
FIG. 2, previously described, is a circuit diagram of a single-switch SRM control circuit that is known in the art.
Figure 3:
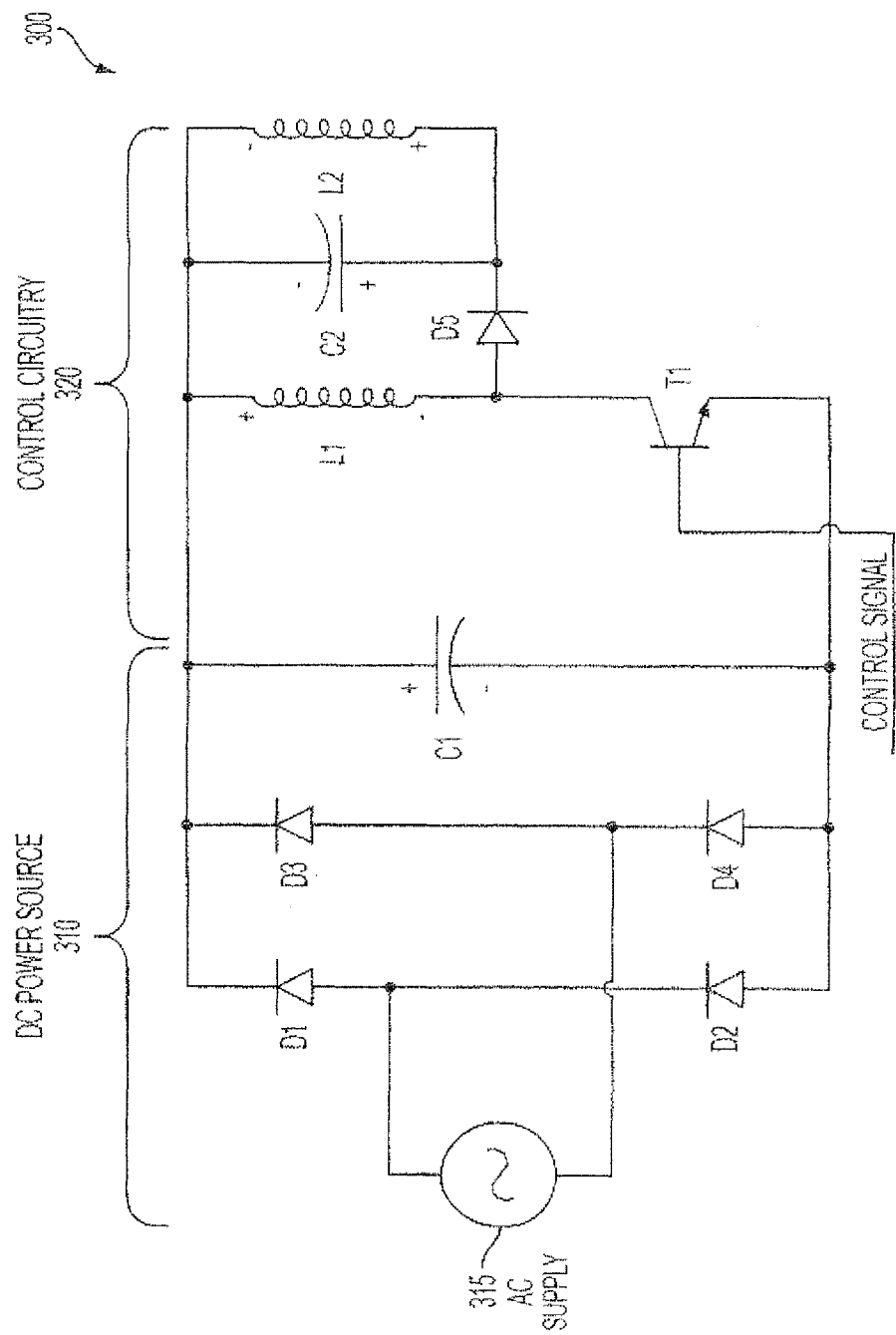
FIG. 3 is a circuit diagram of an exemplary single-switch SRM control circuit that may be used in accordance with a first disclosed embodiment of the invention.

FIG. 3 illustrates an exemplary single-switch SRM control circuit 300 that may be used in accordance with a first disclosed embodiment of the invention. The disclosed control circuit 300 includes a DC power source 310 and control circuitry 320. For example, the DC power source 310 may comprise an AC voltage supply 315, a full-bridge rectifier (diodes D1, D2, D3, and D4), and a source capacitor C1. The source capacitor C1 may be polarized, so as to maintain a substantially DC (i.e., constant) voltage level between its positive terminal ("positive rail") and negative terminal ("negative rail," "common," or "ground"). Those skilled in the art will appreciate that other types of DC power sources alternatively could be substituted, e.g., using half-bridge rectifiers or DC voltage supplies, such as batteries.

The control circuitry 320 includes, among other things, a main phase winding L1 and an auxiliary phase winding L2. The main and auxiliary phase windings may be positioned on one more stator poles 115 in a multi-phase SRM. In some embodiments, the main phase winding L1 may be configured to generate the majority of torque in the SRM, whereas the auxiliary phase winding L2 may be used to assist the main phase winding in its commutation, speed reversal, and/or torque production.

Each of the main and auxiliary phase windings L1 and L2 may consist of one or more electrically-conductive coils, such as copper-wire coils, that can be connected in series or in parallel within a phase winding. The auxiliary phase winding L2 need not exhibit the same properties as the main phase winding L1, and may comprise, for example, a different current-carrying capability, number of turns, volume of copper, and/or cross-sectional area (gauge). More generally, the electrical and material properties of the main and auxiliary phase windings may be selected based on the particular application employing the control circuit 300 and cost considerations imposed by that application. Although the phase windings L1 and L2 may be spatially separated from the control circuitry 320, and in some cases may be considered to form part of the multi-phase machine rather than part of its control circuitry, the phase windings L1 and L2 are illustrated in the control circuitry 320 for purposes of discussion.

According to the first disclosed embodiment, the positive terminal' of the main phase winding L1 may be electrically connected to the positive rail of the DC power source 310, and the negative terminal of the main phase winding may be electrically connected to both an anode terminal of a diode D5 and a collector terminal of a switch T1. The emitter terminal of the switch T1 may be connected to the negative rail of the DC power source 310. By way of example, the exemplary switch T1 is shown as a NPN bipolar junction ("BJT") transistor. However, switch T1 alternatively may comprise any type of electrical, mechanical, or electro-mechanical switch (such as a relay). For example, the switch T1 may be implemented using at least one transistor switch including, but not limited to, a BJT transistor switch, a metal-oxide-semiconductor ("MOS") transistor switch, a field effect transistor ("FET") switch, an insulated gate bipolar transistor ("IGBT") switch, etc., or any variation or combination thereof.

Further to the first disclosed embodiment, a negative terminal of the auxiliary phase winding L2 may be electrically connected to the positive rail of the DC power source 310, and a positive terminal of the auxiliary phase winding L2 may be electrically connected to a cathode terminal of the diode D5. The positive terminal of the auxiliary phase winding L2 also may be electrically connected to a positive terminal of an auxiliary capacitor C2. The auxiliary capacitor C2 may be a polarized capacitor having an opposite polarity than the source capacitor C1. For example, as shown, the negative terminal of the auxiliary capacitor C2 may be electrically connected to the positive terminal of the source capacitor C1.

In operation, the transistor switch T1 can be turned ON and OFF by a control signal (or "gating signal"), e.g., applied to the base terminal of the transistor switch T1. To that end, the base terminal may be coupled to gate drive electronics (not shown) including, for example, a microprocessor, a digital signal processor ("DSP"), an application specific integrated circuit, a field programmable gate array, or any other processing and/or logic circuitry that provides the control signal to the transistor switch T1. When the switch T1 is turned ON, e.g., in a conducting state, a current flows from the positive rail of the DC power source 310, through the main phase winding L1, through the switch T1, to the negative rail of the DC power source. While the transistor switch T1 is turned ON, essentially no charge accumulates in the auxiliary capacitor C2 because of its opposite polarity relative to the source capacitor C1. Further, the orientation of diode D5 prevents current from flowing through the auxiliary phase winding L2 while the main phase winding L1 is being energized.

When the current through the main phase winding L1 exceeds a predetermined level, or some other criteria is satisfied, the control signal applied to the transistor switch T1 may be adjusted to turn the switch OFF, e.g., in a non-conducting state. In this case, the current through the main phase winding L1 is redirected through the diode D5 to the auxiliary capacitor C2. The auxiliary capacitor C2 and diode D5 function as a snubber circuit for the transistor T1. Because the auxiliary capacitor C2 has accumulated essentially no charge while the switch T1 was turned ON, the auxiliary capacitor C2 becomes charged by the redirected current until the capacitor eventually stores enough energy to essentially discontinue the current flow in the main phase winding L1. The auxiliary capacitor C2 may have a relatively small capacitance compared with the source capacitance C1 to ensure that it can charge quickly.

Substantially all of the energy captured by the auxiliary capacitor C2 can be used to generate a current in the auxiliary phase winding L2. Specifically, the auxiliary capacitor C2 can discharge its stored energy as a current through the auxiliary phase winding L2, where the discharged current is subsequently consumed to produce a torque in the multi-phase SRM. The diode D5 can ensure that the current discharged from the auxiliary capacitor C2 flows directly into the auxiliary phase winding L2, and not back into the main phase winding L1. In this controlled manner, substantially all of the redirected current is consumed in the auxiliary phase winding L2, thereby avoiding current in the auxiliary phase winding L2 from circulating back into the main phase winding L1 or into the source capacitor C1. Moreover, this single-switch topology also avoids the need for active control of current through the auxiliary phase winding L2, and hence prevents harmonic-related core losses in the auxiliary phase winding.

In the first disclosed embodiment, the negative rail of the DC power source 310 can be used as a common potential for the control circuitry 320 as well as for the gate drive electronics (not shown) and any other associated computational circuitry (not shown). In this context, and as previously discussed, gate drive or gate control electronics refer to any logic and/or processing circuitry for generating the control signal used to toggle (or "gate") the transistor switch ON/OFF. The other associated computational circuitry may include logic and/or processing circuitry including, for example, a microprocessor, DSP, etc., to implement a control strategy for toggling the switch T1. Since only a single common potential may be used in the multi-phase SRM, without having to electrically isolate the DC power supply or the control, gating, or computational circuitry, the relative size, complexity, and cost of the control circuit 300 can be reduced.

Figure 4:
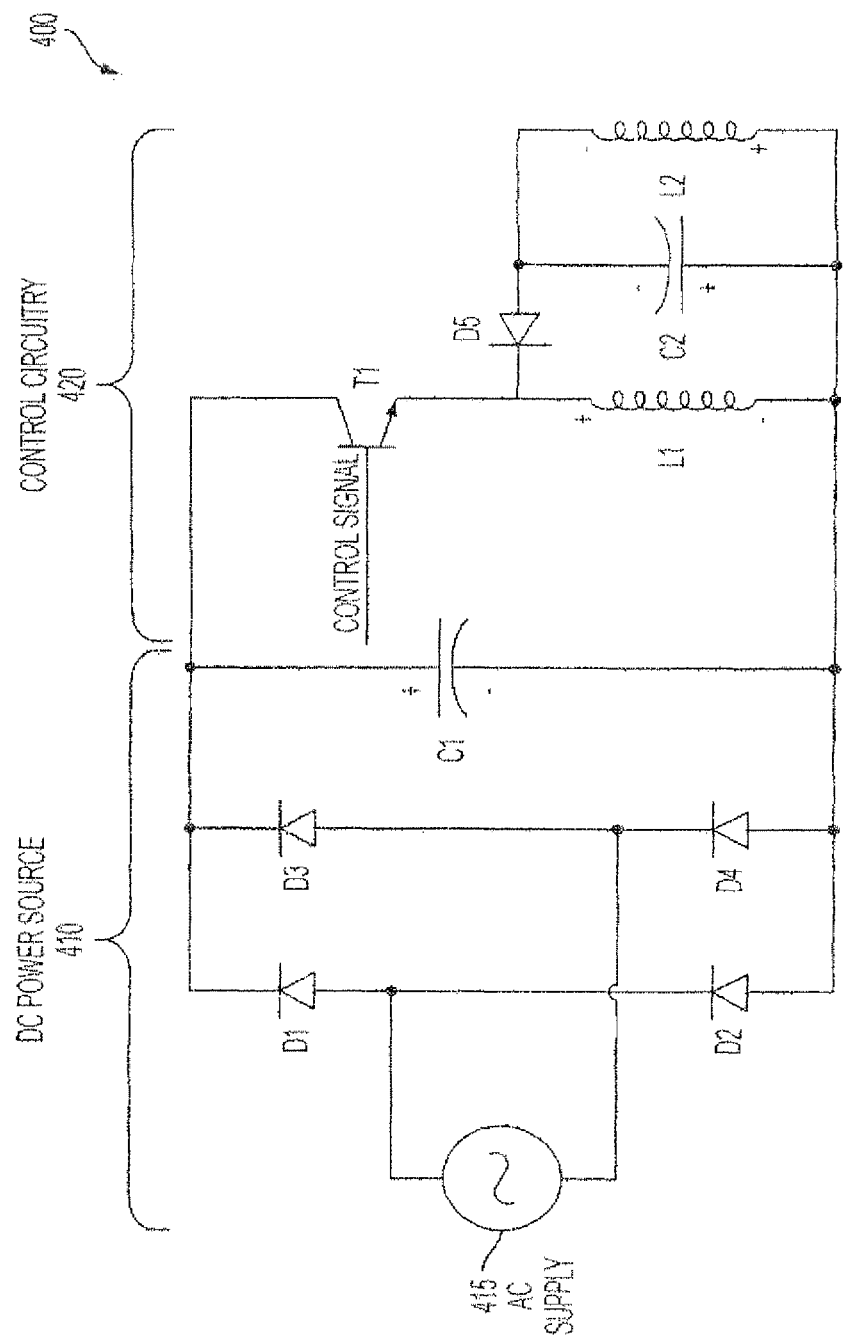
FIG. 4 is a circuit diagram of an exemplary single-switch SRM control circuit that may be used in accordance with a second disclosed embodiment of the invention.

FIG. 4 illustrates an exemplary single-switch SRM control circuit that may be used in accordance with a second disclosed embodiment of the invention. The disclosed control circuit 400 includes a DC power source 410 and control circuitry 420. For example, the DC power source 410 may comprise an AC voltage supply 415, a full-bridge rectifier (diodes D1, D2, D3, and D4), and a source capacitor C1. The source capacitor C1 may be polarized, so as to maintain a substantially DC (i.e., constant) voltage level between its positive terminal ("positive rail") and negative terminal ("negative rail," "common," or "ground"). Those skilled in the art will appreciate that other types of DC power sources alternatively could be substituted, e.g., using half-bridge rectifiers or DC voltage supplies, such as batteries.

The control circuitry 420 includes, among other things, a main phase winding L1 and an auxiliary phase winding L2. The main and auxiliary phase windings may be positioned on one more stator poles 115 in a multi-phase SRM. In some embodiments, the main phase winding L1 may be configured to generate the majority of torque in the SRM, whereas the auxiliary phase winding L2 may be used to assist the main phase winding in its commutation, speed reversal, and/or torque production.

Each of the main and auxiliary phase windings L1 and L2 may consist of one or more electrically-conductive coils, such as copper-wire coils, that can be connected in series or in parallel within a phase winding. The auxiliary phase winding L2 need not exhibit the same properties as the main phase winding L1, and may comprise, for example, a different current-carrying capability, number of turns, volume of copper, and/or cross-sectional area (gauge). More generally, the electrical and material properties of the main and auxiliary phase windings may be selected based on the particular application employing the control circuit 400 and cost considerations imposed by that application. Although the phase windings L1 and L2 may be spatially separated from the control circuitry 420, and in some cases may be considered to form part of the multi-phase machine rather than part of its control circuitry, the phase windings L1 and L2 are illustrated in the control circuitry 420 for purposes of discussion.

According to the second disclosed embodiment, a collector terminal of a switch T1 may be electrically connected to the positive rail of the DC power source 410, and an emitter terminal of the switch T1 may be electrically connected to a positive terminal of the main phase winding L1. The positive terminal of the main phase winding L1 also may be electrically connected to a cathode terminal of a diode D5. The anode terminal of the diode D5 may be connected to both a negative terminal of the auxiliary phase winding L2 and a negative terminal of an auxiliary capacitor C2. The negative terminal of the main phase winding L1, the positive terminal of the auxiliary phase winding L2, and the positive terminal of the auxiliary capacitor C2 all may be electrically connected to the negative rail of the DC power source 410. The auxiliary capacitor C2 may be a polarized capacitor having an opposite polarity than the source capacitor C1. For instance, in the configuration shown, the positive terminal of the auxiliary capacitor C2 may be electrically connected to the negative terminal of the source capacitor C1.

By way of example, the exemplary switch T1 is shown as a NPN bipolar junction transistor in the control circuit 400. However, switch T1 alternatively may comprise any type of electrical, mechanical, or electro-mechanical switch (such as a relay). For example, the switch T1 may be implemented using at least one transistor switch including, but not limited to, a BJT transistor switch, a metal-oxide-semiconductor transistor switch, a field effect transistor switch, an insulated gate bipolar transistor switch, etc., or any variation or combination thereof.

The transistor switch T1 can be turned ON and OFF by a control signal (or "gating signal"), e.g., applied to the base terminal of the transistor switch T1. To that end, the base terminal of the transistor switch T1 may be coupled to control electronics (not shown), such as a microprocessor, a digital signal processor, an application specific integrated circuit, a field programmable gate array, or any other processing and/or logic circuitry that provides the control signal to the transistor switch T1. Because the emitter voltage of the transistor switch T1 fluctuates significantly, for example, from toggling between the switch's ON and OFF operational states, the gate drive electronics (not shown) supplying the control signal to the transistor switch T1 may be electrically isolated from the control circuit 400.

When the switch T1 is turned ON, e.g., in a conducting state, a current flows from the positive rail of the DC power source 310, through the conducting switch T1, through the main phase winding L1, to the negative rail of the DC power source. While the transistor switch T1 is turned ON, essentially no charge accumulates in the auxiliary capacitor C2 because of its opposite polarity relative to the source capacitor C1. Further, the orientation of diode D5 prevents current from flowing through the auxiliary phase winding L2 while the main phase winding L1 is being energized.

When the current through the main phase winding L1 exceeds a predetermined level, or some other criteria is satisfied, the control signal applied to the transistor switch T1 may be adjusted to turn the switch OFF, e.g., in a non-conducting state. In this case, the current through the main phase winding L1 is redirected to the auxiliary capacitor C2. Because the auxiliary capacitor C2 has accumulated essentially no charge while the switch T1 was turned ON, the auxiliary capacitor C2 becomes charged by the redirected current until the capacitor eventually stores enough energy to essentially discontinue the current flow in the main phase winding L1. The auxiliary capacitor C2 may have a relatively small capacitance compared with the source capacitance C1 to ensure that it can charge quickly.

Substantially all of the energy captured by the auxiliary capacitor C2 can be used to generate a current in the auxiliary phase winding L2. Specifically, the auxiliary capacitor C2 can discharge its stored energy as a current through the auxiliary phase winding L2, where the discharged current is subsequently consumed to produce a torque in the multi-phase SRM. The diode D5 can ensure that the current discharged from the auxiliary capacitor C2 flows directly into the auxiliary phase winding L2, and not back into the main phase winding L1. In this controlled manner, substantially all of the redirected current is consumed in the auxiliary phase winding L2, thereby avoiding current in the auxiliary phase winding L2 from circulating back into the main phase winding L1 or into the source capacitor C1. Moreover, this single-switch topology also avoids the need for active control of current through the auxiliary phase winding L2, and hence prevents harmonic-related core losses in the auxiliary phase winding.

Further to the second disclosed embodiment, relatively small "current sensing" resistors (not shown) can be added in series with the main and auxiliary phase windings L1 and L2 for monitoring the amount of current flowing in each of these machine windings. For example, a first current-sensing resistor (not shown) can be added in series between the negative terminal of the main phase winding L1 and the common potential. Similarly, a second current-sensing resistor (not shown) can be added in series between the positive terminal of the auxiliary phase winding L2 and the common potential. The voltages across these current-sensing resistors may be fed back to the gate drive electronics (not shown) or other associated control circuitry that use the current-sensing measurements to adjust the control signal applied to the transistor switch T1.

Usually current sensors are expensive in low-cost application environments and this embodiment uniquely affords the measurement of instantaneous phase winding currents in an inexpensive manner and without isolation. For instance, if the common voltage for the control electronics (not shown) is the negative rail of the DC source voltage, then the sensed currents can be obtained in the form of voltage drops across the current-sensing resistors with no need for galvanic isolation between the sensed signals and the control circuitry to which they are input. Likewise, voltages applied across the main and auxiliary phase windings can be measured, for example, using two sensing resistors (not shown) each connected between a respective one of the main and auxiliary phase windings and the negative rail of the DC source. Again, these sensed voltage signals need no isolation for feeding them to the control circuitry. Such sensed voltages and currents can be used by the control electronics to determine or estimate various SRM machine parameters, such as the rotor position, electrical input power to the phase windings, and so forth, which in turn may be used to control the multi-phase SRM via the control signal applied to the transistor switch T1.

The foregoing has been a detailed description of possible embodiments of the invention. Other embodiments of the invention will be apparent to those skilled in the art from consideration of the specification and practice of the invention disclosed herein. For example, while the exemplary control circuits 300 and 400 disclosed herein may not require additional self-starting circuitry, such as permanent magnets or windings (not shown), it is also expressly contemplated that the disclosed control circuits may be used in conjunction with such self-starting circuitry. Further, the disclosed exemplary single-switch control circuits may be employed with various multi-phase SRM machines, i.e., having two or more phases, as well as with permanent magnet brushless machines having two or more phases. In addition, while each of the exemplary control circuits 300 and 400 may be used to control a two-phase SRM, it is also expressly contemplated that a multi-phase SRM more generally may employ one or more of the exemplary control circuits. For example, a four-phase SRM may include two different single-switch control circuits in accordance with the exemplary embodiments, each circuit used to control a different pair of SRM phases.

Although the disclosed exemplary embodiments are hardware-based implementations, it is expressly contemplated that at least portions of the invention can be implemented in software, including a computer-readable medium having program instructions executing on a computer, firmware, hardware, or combinations thereof, as will be apparent to those skilled in the art. Moreover, the disclosed embodiments are not limited to the exemplary circuitry shown in FIGS. 3 and 4. Rather, those skilled in the art will understand that the teachings of the invention are consistent with other embodiments that may employ other electrical and/or mechanical components, in addition to or in place of, the particular components shown. Accordingly, it is intended that this specification and its disclosed embodiments be considered as exemplary only, with a true scope and spirit of the invention being indicated by the following claims.

What is claimed is:

1. An electrical device comprising:
a switch;
a unidirectional current element that conducts current unidirectionally; and
a capacitive storage element, wherein:
the switch, unidirectional current element, and capacitive storage element are interconnected, with no direct electrical connection between the switch and capacitive storage element, such that when interconnected with a direct current (dc) voltage supply and first and second windings:
a first operational state exists in which a conductive condition of the switch causes the dc voltage supply to conduct current through the first winding and switch, thereby storing energy in the first winding,
a second operational state exists in which a non-conductive condition of the switch causes the first winding to discharge stored energy by conducting current through the unidirectional current element and capacitive storage element, thereby storing energy in the capacitive storage element, and
a third operational state exists in which energy stored in the capacitive storage element is discharged by the conduction of current through the second winding, without conducting current through the dc voltage supply, and
at all times during the first, second, and third operational states, the second winding is electrically connected in parallel with the capacitive storage element such that a voltage existing across the second winding is the same voltage existing across the capacitive storage element.

2. The electrical device of claim 1, further comprising:
a dc storage capacitance, wherein
the dc storage capacitance and capacitive storage element have direct electrical connectivity but do not conduct current through an electrical circuit that is common to both the dc storage capacitance and capacitive storage element.

3. The electrical device of claim 1, wherein the current conducted through the unidirectional current element and capacitive storage element during the second operational state is not conducted through the dc voltage supply.

4. The electrical device of claim 1, wherein the energy stored in the capacitive storage element is discharged by the conduction of current through an electrical circuit consisting essentially of the capacitive storage element and second winding.

5. An electrical device comprising:
first and second windings;
a unidirectional current element that conducts current unidirectionally;
a switch that is directly connected with the first winding and the unidirectional current element; and
a capacitive storage element, wherein:
at all times when a direct current (dc) voltage supply is provided to the electrical device:
the second winding is electrically connected in parallel with the capacitive storage element such that a voltage existing across the second winding is the same voltage existing across the capacitive storage element, and
the capacitive storage element and unidirectional current element are electrically connected in parallel with the first winding such that a voltage existing across a series connection of the capacitive storage element and unidirectional current element is the same voltage existing across the first winding.

6. The electrical device of claim 5, wherein when the dc voltage supply is provided to the electrical device:
a first operational state exists in which a conductive condition of the switch causes the dc voltage supply to conduct current through the first winding and switch, thereby storing energy in the first winding,
a second operational state exists in which a non-conductive condition of the switch causes the first winding to discharge stored energy by conducting current through the unidirectional current element and capacitive storage element, thereby storing energy in the capacitive storage element, and
a third operational state exists in which energy stored in the capacitive storage element is discharged by the conduction of current through the second winding, without conducting current through the dc voltage supply.

7. The electrical device of claim 6, wherein the current conducted through the unidirectional current element and capacitive storage element during the second operational state is not conducted through the dc voltage supply.

8. The electrical device of claim 6, wherein the unidirectional current device prevents the capacitive storage element from conducting current through the first winding.

9. The electrical device of claim 6, wherein the energy stored in the capacitive storage element is discharged by the conduction of current through an electrical circuit consisting essentially of the capacitive storage element and second winding.

10. The electrical device of claim 5, wherein the first and second windings are constituents of a single phase of an electrical machine.

11. The electrical device of claim 5, wherein when the dc voltage supply is provided to the electrical device:
- a first operational state exists in which a conductive condition of the switch causes the dc voltage supply to conduct current through the first winding and switch, thereby storing energy in the first winding,
- a second operational state exists in which a non-conductive condition of the switch causes the first winding to discharge stored energy by conducting current through the unidirectional current element and capacitive storage element, without conducting current through the dc voltage supply, thereby storing energy in the capacitive storage element, and
- a third operational state exists in which energy stored in the capacitive storage element is discharged by the conduction of current through the second winding.

12. The electrical device of claim 11, wherein the energy stored in the capacitive storage element is discharged by the conduction of current through an electrical circuit consisting essentially of the capacitive storage element and second winding.

13. The electrical device of claim 5, further comprising:
- third and fourth windings;
- another unidirectional current element that conducts current unidirectionally; and
- another capacitive storage element, wherein:
  - when the dc voltage supply is provided to the electrical device:
    - the fourth winding is electrically connected in parallel with the other capacitive storage element, and
    - the other capacitive storage element and the other unidirectional current element are electrically connected in parallel with the third winding, and
  - each of the first through fourth windings is a distinct winding of a four-phase electrical machine.

14. The electrical device of claim 5, further comprising:
- third and fourth windings;
- another unidirectional current element that conducts current unidirectionally; and
- another capacitive storage element, wherein:
  - when the dc voltage supply is provided to the electrical device:
    - the fourth winding is electrically connected in parallel with the other capacitive storage element, and
    - the other capacitive storage element and the other unidirectional current element are electrically connected in parallel with the third winding,
  - the first and second windings are constituents of a single, first-phase of an electrical machine, and
  - the third and fourth windings are constituents of a single, second-phase of the electrical machine.

15. A method of operating an electrical motor, the method comprising:
- executing a first operation in which a conductive state of a switch causes a direct current (dc) voltage supply to conduct current through a first winding of the electrical motor and the switch, thereby storing energy in the first motor winding;
- executing a second operation in which a non-conductive state of the switch causes the first motor winding to discharge stored energy by conducting current through a capacitive storage element, thereby storing energy in the capacitive storage element; and
- executing a third operation in which energy stored in the capacitive storage element is discharged by the conduction of current through a second winding of the electrical motor, without conducting current through the dc voltage supply, wherein
- at all times during the first, second, and third operations, the second winding is electrically connected in parallel with the capacitive storage element such that a voltage existing across the second winding is the same voltage existing across the capacitive storage element.

16. The method of claim 15, wherein the current conducted through the capacitive storage element during the second operation is not conducted through an energy storage element of the dc voltage supply.

17. The method of claim 15, wherein the discharge of energy stored in the capacitive storage element does not conduct current through the first motor winding.

18. The method of claim 15, wherein the energy stored in the capacitive storage element is discharged by the conduction of current through an electrical circuit consisting essentially of the capacitive storage element and the second winding.

19. A method of operating an electrical motor, the method comprising:
- executing a first operation in which a conductive state of a switch causes a direct current (dc) voltage supply to conduct current through a first winding of the electrical motor and the switch, thereby storing energy in the first motor winding;
- executing a second operation in which a non-conductive state of the switch causes the first motor winding to discharge stored energy by conducting current through a capacitive storage element, without conducting current through the dc voltage supply, thereby storing energy in the capacitive storage element; and
- executing a third operation in which energy stored in the capacitive storage element is discharged by the conduction of current through a second winding of the electrical motor, wherein
- at all times during the first, second, and third operations, the second winding is electrically connected in parallel with the capacitive storage element such that a voltage existing across the second winding is the same voltage existing across the capacitive storage element.

20. The method of claim 19, wherein the discharge of energy stored in the capacitive storage element does not conduct current through the first motor winding.

21. The method of claim 19, wherein the energy stored in the capacitive storage element is discharged by the conduction of current through an electrical circuit consisting essentially of the capacitive storage element and the second winding.

* * * * *